United States Patent [19]

Bullock

[11] Patent Number: 5,316,190
[45] Date of Patent: May 31, 1994

[54] UTILITY RACK FOR VEHICLE

[76] Inventor: Roddy M. Bullock, 2620 Oak Haven, San Marcos, Tex. 78666

[21] Appl. No.: 8,652

[22] Filed: Jan. 25, 1993

[51] Int. Cl.⁵ .............................................. B60P 3/00
[52] U.S. Cl. ................................. 224/42.42; 296/3;
 224/282; 224/42.45 R; 224/42.42; 224/321;
 211/182
[58] Field of Search ............... 224/42.42, 42.43, 42.44,
 224/282, 317, 320, 42.45 R, 321, 325, 309;
 296/3, 37.6, 37.7; 211/183, 182, 195

[56] References Cited

U.S. PATENT DOCUMENTS

| | | | |
|---|---|---|---|
| 3,891,262 | 6/1975 | Brunel | 296/3 |
| 4,152,020 | 5/1979 | Brown et al. | 296/3 |
| 4,509,787 | 4/1985 | Knaack et al. | 296/3 |
| 4,659,131 | 4/1987 | Flournoy, Jr. | 296/3 |
| 4,770,458 | 9/1988 | Burke et al. | 296/3 |
| 4,854,628 | 8/1989 | Halberg | 296/3 |
| 5,002,324 | 3/1991 | Griffin | 296/3 |
| 5,037,152 | 8/1991 | Hendricks | 296/3 |
| 5,152,570 | 10/1992 | Hood | 296/3 |
| 5,190,337 | 3/1993 | McDaniel | 296/3 |

Primary Examiner—Ernest G. Cusick
Attorney, Agent, or Firm—Roddy M. Bullock

[57] ABSTRACT

An aesthetically pleasing folding utility rack suitable for carrying elongated or oversized objects in the extended position comprises a horizontal rail or plate, a forward transverse rack member fixed to the horizontal rail, a moveable rear transverse rack member and a pivotal connection means which connects the rear transverse rack member to the horizontal rail and allows the rear transverse rack member to be moved quickly and easily from an open extended position to a closed position. In the closed position the rack has the general appearance of a roll bar.

6 Claims, 3 Drawing Sheets

UTILITY RACK FOR VEHICLE

FIELD OF THE INVENTION

This invention relates to racks for carrying elongated or oversized loads on vehicles, and more specifically to racks in which a portion of the rack is foldable to allow easier access to cargo areas, and provide a more aesthetically pleasing appearance on vehicles such as pickup trucks and the like.

BACKGROUND OF THE INVENTION

Pickup trucks have long been used as work vehicles by tradesmen, such trucks generally being characterized by a cab and a rearward cargo area, called the bed, surrounded by three side walls and a rearward tailgate. The pickup truck is also becoming very popular as a sport vehicle, particularly the smaller size trucks which are primarily meant to be stylish, and only occasionally are actually used to carry substantial loads. Many pickup trucks are dual-use, serving both as a sport and a work vehicle.

Utility racks are commonly installed over the bed of pickup trucks to enable the truck to carry and transport articles which do not fit in, or cannot be secured to, the bed of the truck. Such articles include tools and equipment for tradesmen such as ladders, pipe, lumber, and steel, as well as articles and objects used by sportsmen such as boats and canoes. Such racks allow the articles to be carried above, and extend over, the cab of the pickup truck without risk of damage to the articles or the truck.

Generally such utility racks installed on pickup trucks and similar vehicles are of rigid steel construction and comprise at least four vertical support members which attach in some fashion to the bed of the truck at or near the corners. Attached to the vertical support members at a height above the cab of the truck are a plurality of horizontal support members, with at least two such horizontal members located transversely across the bed of the truck. Examples of such racks are taught in U.S. Pat. No. 4,509,787 to Knaack, and U.S. Pat. No. 4,152,020 to Brown et al. While such racks are functional for their intended purposes, they are generally heavy, difficult to remove, and prohibit access to the bed for objects, such as refrigerators, which are too tall to fit under the horizontal support members. Such racks also detract from the appearance of pickup trucks, particularly small or stylish trucks which are primarily used for sport, and only occassionally have a need to carry oversized objects. Collapsible and folding racks are known in the art as taught in U.S. Pat. No. 4,659,131 to Flourney, and U.S. Pat. No. 4,854,628 to Halberg. The rack taught by Flourney allows for collapsing the rack to gain access to the truck bed, but it is still a rather complicated construction, with many moving parts, and is unsightly both in the full open and collapsed positions. The Halberg invention, while approaching the simplicity and functionality desired for sport and dual-use trucks, is still rather cumbersome, generally requiring cables which are prone to stretching and kinking, and become ungainly and a snag-hazard in the closed position. The Halberg invention also occupies valuable cargo space in the bed of pickup trucks and the like.

There is a continuing unaddressed need for a simple, easy to use folding utility rack which is aesthetically pleasing when not in use, and allows for unrestricted access to the area of the bed of vehicles such as pickup trucks and the like.

SUMMARY OF THE INVENTION

In accordance with the present invention, the utility rack comprises a horizontal rail or plate adapted to fit along the front and the sides of the utility bed of a vehicle, a forward transverse rack member fixed to the horizontal rail, and a rear transverse rack member which is moveable, pivoting about a point fixed to the horizontal rail. Pivotal connection means allow the rear transverse rack member to be moved quickly and easily from an open extended position to a closed position.

The horizontal rail has generally the cross-section of angle iron, being inverted in use, such that one leg of the angle rests on top of the three lateral side walls of the vehicle bed, and the other leg of the angle extends downward on the inside face of the three lateral side walls of the vehicle bed.

The forward transverse rack member comprises at least two forward generally vertical support members connected at their base to the horizontal rail at or near the corners of the vehicle bed, and connected at or near their distal end by at least one forward horizontal support member at a height above the cab of the vehicle.

The moveable rear transverse rack member is a unitized construction comprising two rear vertical support members which are connected proximally to the horizontal rail by a pivotal connection means, and are connected at or near their distal ends by at least one rear horizontal support member. The pivotal connection means consists of any suitable pin or bolt arrangement. The rear vertical support members are shaped such that in the open position the segments proximal to the pivot points rest horizontally on the horizontal rails which are in turn supported by the side walls of the vehicle bed. The remaining length of the rear support members rise in a cantilevered manner which allows the rear horizontal support member. In the closed position, the distal end of the two rear vertical support members rest on or against the forward transverse rack member, and in a preferred embodiment said members rest in a suitable channel or catch arrangement which prevents unwanted movement of the rear transverse rack member when in the closed position.

The present invention provides a folding utility rack for vehicles which serves to carry and transport elongated articles when in the open position, and has the aesthetically pleasing look of a roll bar when in the closed position.

The present invention also provides a folding utility rack for vehicles which is of a simplified construction comprising one moving part, and which is quick and easy to fold from one position to another.

The utility rack mounts to the sidewall of pickup trucks, allowing unrestricted access to all the area within the bed of the pickup truck.

The rack may be quickly and easily removed so as to allow unrestricted access to all the area within and above the bed of the truck.

These features and advantages of the present invention will become more apparent upon review of the following detailed description taken in conjunction with the accompanying drawings.

DETAILED DESCRIPTION OF THE INVENTION

The present invention is now described in terms of the figures to more carefully delineate in more detail the scope, materials, and conditions of a preferred embodiment of the present invention. While the invention is described in terms of the utility rack for a truck bed, it is understood that the rack can be used with the bed of any vehicle such as a wagon, carriage, sleigh, trailer or the like.

Figure 1:
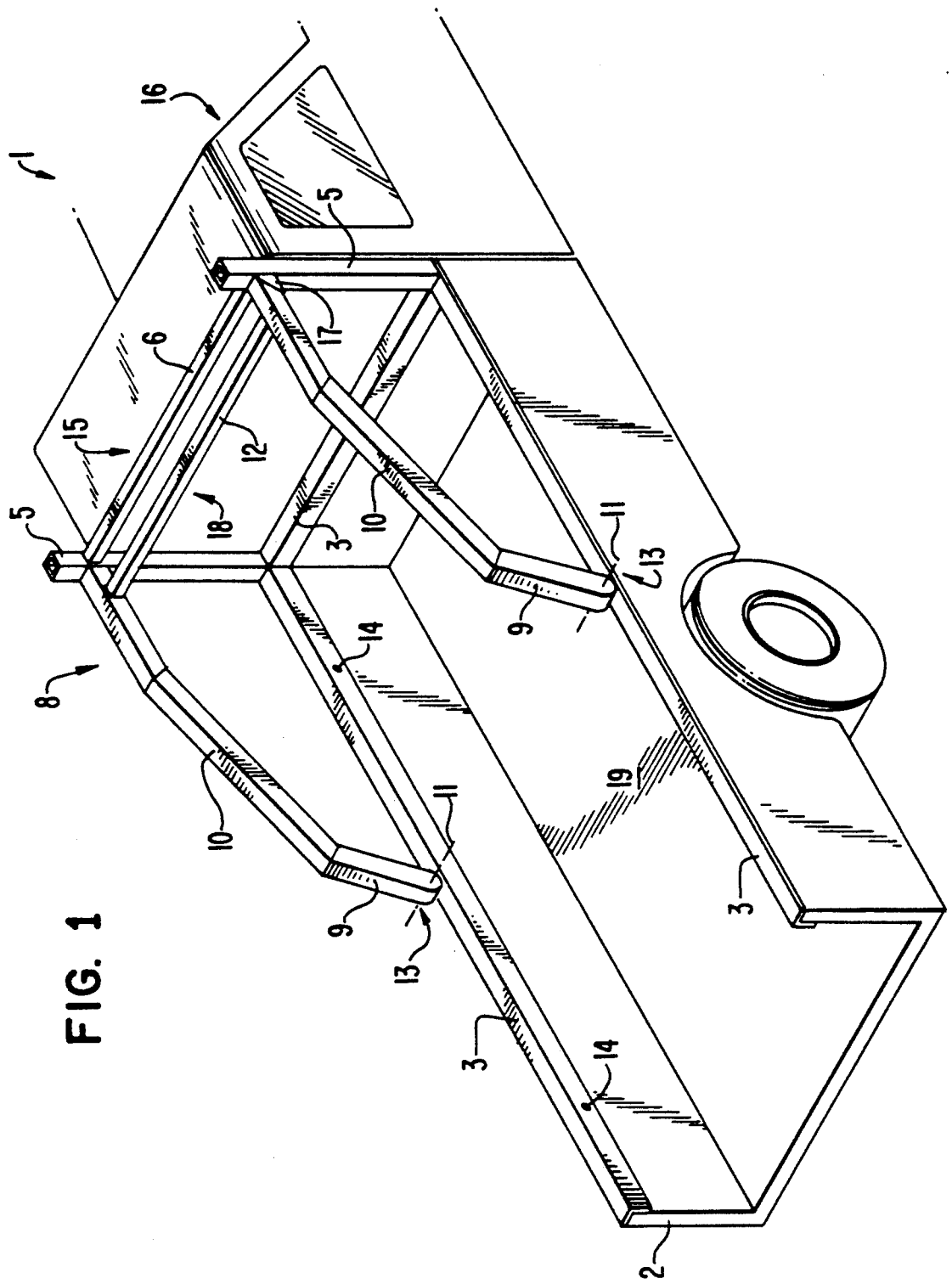
FIG. 1 is a perspective view of a pickup truck with the rack of the present invention constructed of tubing of square cross-section mounted thereto in the closed position.

Referring to FIG. 1 of the drawings, the utility rack 8 is shown illustrated in its closed position mounted to the side walls 2 of the bed 19 of the pickup truck 1. The rack 8 includes a horizontal rail 3 which rests on the three lateral side walls 2 of the truck bed 19. Mounting of the horizontal rail 3 to the side walls may be accomplished by bolting onto the side wall through holes 14 provided. The horizontal rail 3 serves as the base for the other members of the rack 8. The horizontal rail 3 is made of angle iron, with one leg of the angle resting horizontally on the top of the truck side wall 2, and the other leg of the angle extending vertically downward against the inside of the truck side wall 2.

The forward transverse rack member 15 is mounted to the front of the rack 8, just behind the cab 16 of the pickup truck 1. The framework of the forward transverse rack member 15 may include a variety of structural and ornamental members, but preferably includes a pair of generally vertical forward support members 5 attached at their base to the horizontal rail 3 at or near the corners of the truck bed side walls 2 and desirably following the contour of the truck cab 16. The two generally vertical forward support members 5 are connected at or near their distal ends at a height above the top of the cab 16 by at least one forward horizontal support member 6. The distal ends of the forward vertical support members 5 preferably extend beyond the forward horizontal support member 6 to prevent loads from sliding laterally beyond the limits of the forward transverse rack member 15.

Figure 2:
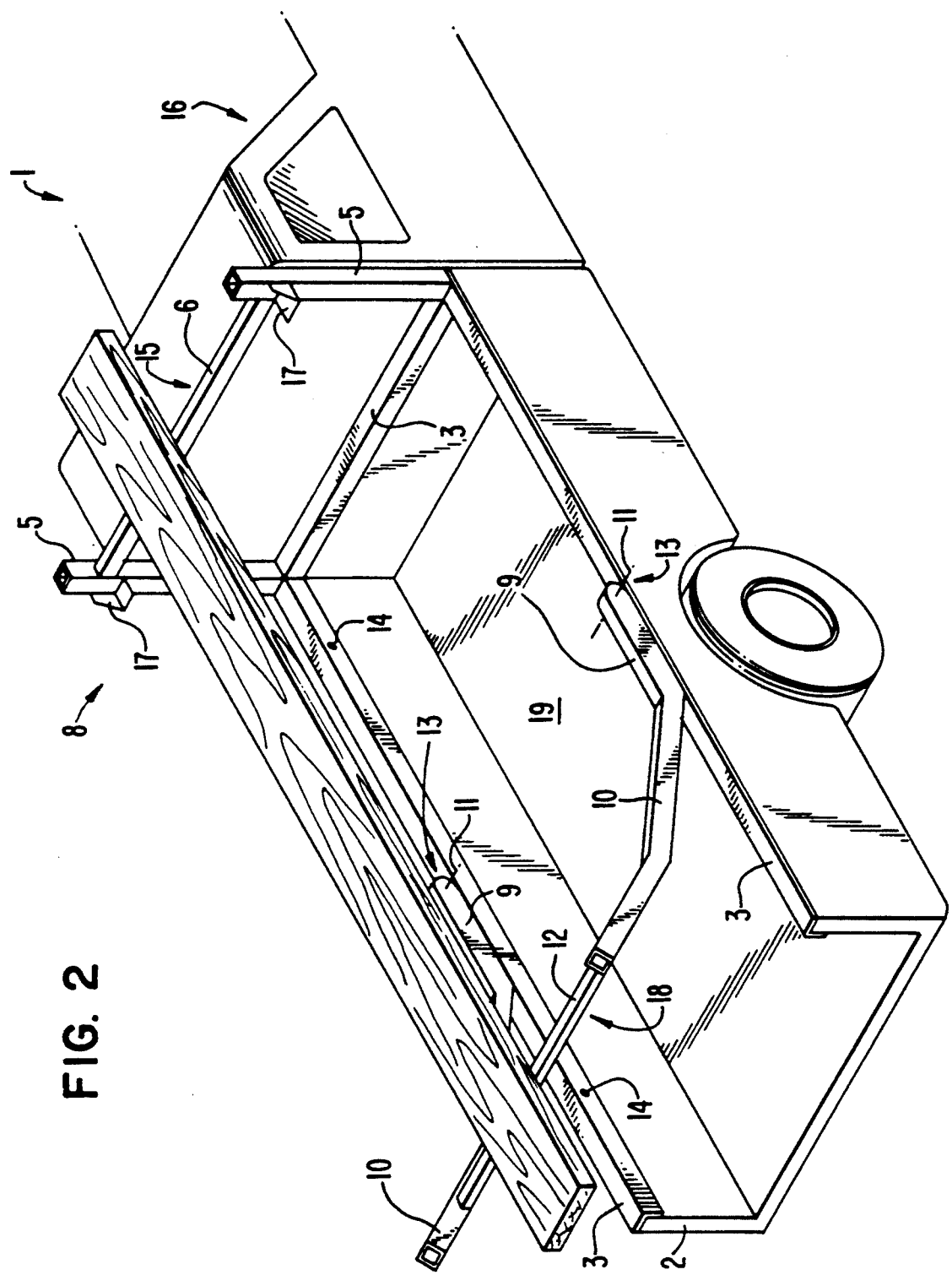
FIG. 2 is a perspective view of a pickup truck with the rack of the present invention mounted thereto in the open position and carrying a load thereon.
Figure 3:
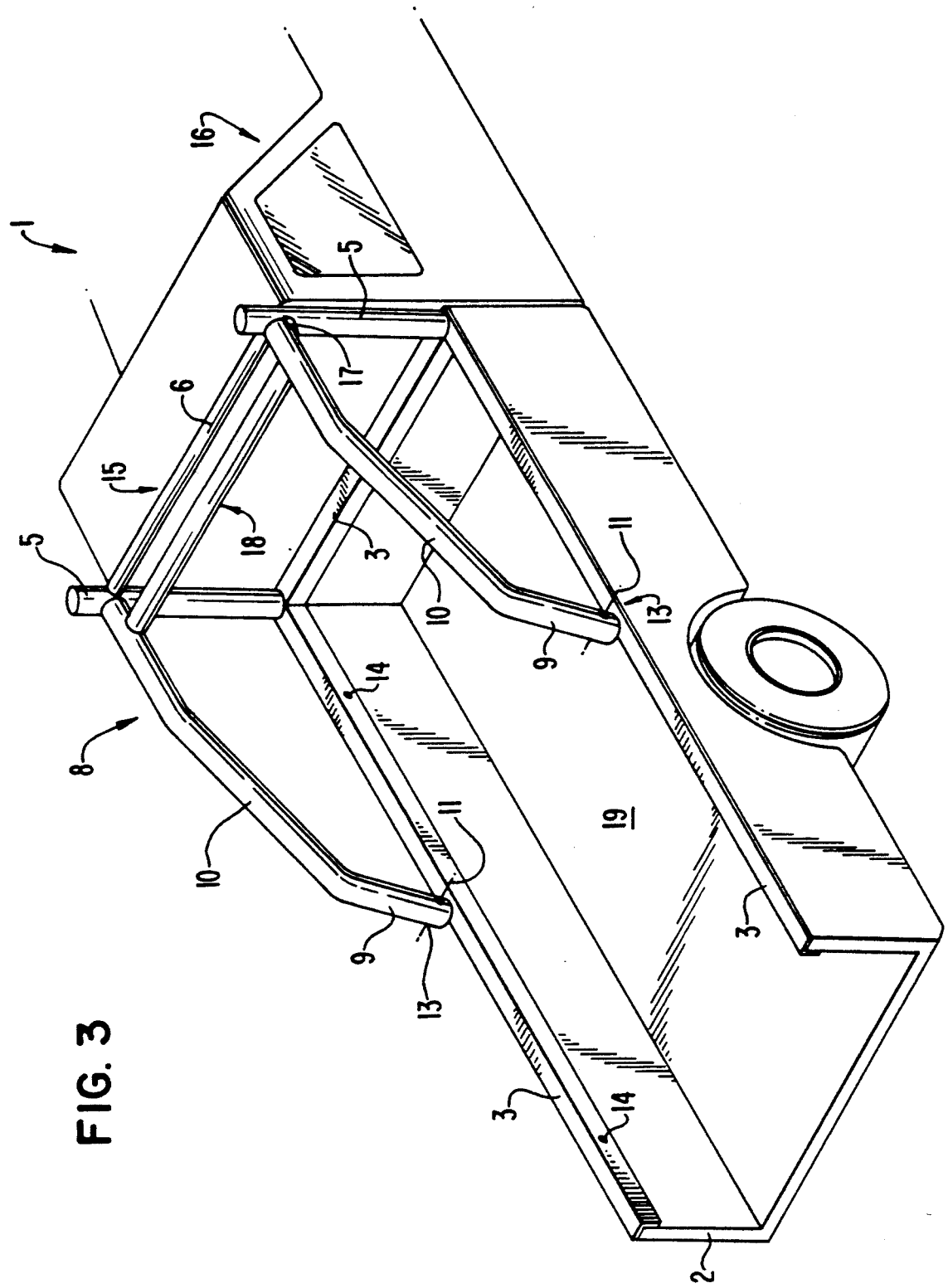
FIG. 3 is a perspective view of a pickup truck with the rack of the present invention constructed of tubing of round cross-section mounted thereto in the closed position.

The rack 8 further includes a moveable rear transverse rack member 18. The rear transverse rack member 18 is comprised of two rear vertical support members 10 connected at or near their distal ends by at least one rear horizontal support member 12. The rear vertical support members 10 are proximally connected by a pivotal connection means to the horizontal rail 3. The rear transverse rack member 18 is therefore movable between a forward, closed position as shown in FIG. 1 and a rearward, open position as shown in FIG. 2. The proximal segment 9 of the two rear vertical support members 10 rests generally horizontally on the horizontal rail 3 when the rack 8 is in the open position. The remaining segments of the two rear vertical support members 10 rise in a cantilevered manner so as to allow the height of the rear horizontal support member 12 to be at or near the same height as the forward horizontal support member 6. The distal ends of the two rear vertical support members 10 preferably extend beyond the rear horizontal support member 12 to prevent loads from sliding laterally beyond the limits of the rear transverse rack member 18.

The pivotal connection means 13 between the rear transverse rack member 18 and the horizontal rail 3 may be accomplished by any suitable means known in the art, such as by bolts or pivot pins 11. The location of the pivotal connection means 13 depends on the length of the rear vertical support members 10, but is made generally at or about the halfway point of the length of the truck bed 19. The rear transverse rack member 18 may be quickly and easily removed by simply removing the bolts or pivot pins 11 on each side. Removal of the rear transverse rack member 18 allows complete unrestricted access to all the area of the truck bed 19.

In the closed position the distal ends of the two rear vertical support members 10 rest in a catch 17 which is preferably made of a small piece of suitable angle iron appropriately positioned on the forward transverse rack member 15.

The forward and rear transverse rack members 15 and 18 are fabricated from sections of appropriately sized steel square tubing, connections being accomplished by welding. The steel tubing is preferably painted with appropriate primers and paints known in the art to prevent or resist oxidation.

The invention has been described in terms of a preferred embodiment. It will be obvious to those skilled in the art, however, that various modifications, additions, and deletions might be made to the illustrated embodiment without departing from the scope of the invention. Various screens and frameworks, for example, may be employed on the forward transverse rack member 15 to protect the rear window of the truck cab 16 from damage. In addition, any cylindrical cross-section tubing, such as round tubing bent to the appropriate shapes, may be used instead of welded square tubing with comparable results in functionality. For reasons of shipping or storage, the connections may be accomplished by bolting, so as to allow for disassembly. Also, locking pins may be employed to lock the rack in either the open or closed position. Various lights, winches, and other apparatus may be added, along with other obvious modifications that might well be made to the illustrated and preferred embodiments without departing from the spirit and scope of the invention as set forth in the claims.

I claim:

1. A utility rack adapted to fit the utility bed of a vehicle comprising:
    (a) a horizontal support rail shaped to form three sides of a rectangle;
    (b) a forward transverse rack member attached near the corners of said horizontal support rail where the two long sides meet the short side of said rectangle;
    (c) a rear transverse rack member proximally connected at about the midpoint of the two long sides of said horizontal support rail, said rear transverse rack member having a proximal portion close to said horizontal support rail and a distal portion remote from said horizontal support rail; and
    (d) pivotal connection means attaching said rear transverse each member to said horizontal support rail wherein said rear transverse rack member is moveable from a forward, closed position wherein the distal portion of said rear transverse member rests generally against said forward transverse rack member, to a rearward, open position, wherein the proximal segment of said rear transverse rack member rests generally horizontally on said horizontal support rail, with the distal end raised in a cantilevered manner.

2. The rack of claim 1 wherein the horizontal support rail is constructed from metal with angle cross-section in three segments which rest accordingly on the three side walls of a pickup truck bed.

3. The rack of claim 1 wherein said forward transverse rack member comprises at least two generally vertical support members connected at their bases to said horizontal support rail, and connected near their distal ends by at least one generally horizontal support member.

4. The rack of claim 1 wherein said rear transverse rack member comprises at least two rear vertical support members connected at their proximal ends to said pivotal connection means, and connected near their distal ends by at least one generally horizontal support member.

5. The rack of claim 1 wherein said forward transverse rack member and said rear transverse rack member are made of metal tubing with generally square cross section.

6. The rack of claim 1 wherein said forward transverse rack member and said rear transverse rack member are made of metal tubing of generally round cross section.

* * * * *